Patented Apr. 28, 1942

2,280,850

UNITED STATES PATENT OFFICE 2,280,850

INSECT REPELLENT CONTAINING NITRILES

Anderson W. Ralston and John P. Barrett, Chicago, Ill., assignors to Armour and Company, Chicago, Ill., a corporation of Illinois No Drawing. Application September 5, 1939, Serial No. 293,521

5 Claims. (Cl. 167—22)

This invention relates to repellents for insects such as mosquitoes, flies, and gnats and more specifically it pertains to repellents which contain aliphatic nitriles containing from ten to fourteen carbon atoms inclusive.

Both humans and animals are annoyed by insects and this problem is so acute as to render certain regions essentially uninhabitable by man. Disregarding the annoyance, insect bites are often accompanied by profound and in some cases serious physiological effects. Many diseases, particularly those of tropical origin, are transmitted by means of insect bites. In spite of man's constant warfare against insects they still occur in large numbers and they continue to plague both man and animals. Insecticide chemists have devoted considerable time and effort to this problem. Thousands of compounds have been tested for their toxic effect upon insects. These compounds either act as stomach poisons or respiratory paralyzers and are effective in a number of instances.

Another approach to the problem, which has also been given considerable thought, is the development of substances which have a repellent effect upon the insects. These substances can be applied upon the host in a variety of manners and serve to prevent attacks by insects which under normal conditions are attracted to these individuals.

Toxicity and repellency are not usually correlated, and it does not follow that a substance toxic to the insect is in any way repellent to it. On the other hand, materials that are repellent to insects are not generally toxic and in a number of cases effective repellents are actually harmless to insects.

In order to be effective for this purpose the substances must, of course, possess a high degree of repellency. In addition they must not be toxic or harmful to the individual treated. In general, it is believed that repellents are irritating to the sensory mechanism of the insect. It does not follow that a substance possessing this sensory irritating effect upon insects has a similar effect upon humans or animals. In a number of instances substances which definitely repel insects are pleasing to man and substances repugnant to man are attractive to insects.

We have experimented extensively with various materials which might have repellent properties and have now discovered that aliphatic nitriles containing from ten to fourteen carbon atoms inclusive are extremely effective insect repellents.

Before describing various practical applications of our discovery we shall first describe the method by which our repellents are tested and will compare the effectiveness of aliphatic nitriles, both saturated and unsaturated, which contain from ten to fourteen carbon atoms in the molecule with other aliphatic nitriles containing less or more than this number of carbon atoms. It will be apparent from the following experimental results that nitriles of ten to fourteen carbon atoms possess unusual and unexpected properties as insect repellents.

Since flies and mosquitoes are the more common insects which it is desired to repel, most of our experimental results have been obtained by using these insects. The nitriles of the present invention are repellents for ants, moths, and other insects commonly met with about the home, factory, food store, barns, and the like.

With flies the test method we use is as follows: Three to four hundred adult domestic flies (*musca domestica*) are confined in a sixteen mesh screened cage. The inside dimensions of the cage are: height, 19.5 inches, width, 9.5 inches, and length, 14.5 inches. The top and bottom, and also the two narrow sides, are of wood and the two broad sides were covered with sixteen mesh screening. The cage is equipped with a trap door for the introduction of water, food, and test samples. The flies used are of known age and are grown under laboratory conditions. Six hours prior to each test the food is removed from the cage. Water is present at all times. The tests are conducted at a constant temperature of 85° F. and 65% relative humidity. Two grams of malt extract (Dimalt Extract—Fleischmann) are placed in the middle of a seven centimeter filter paper and spread into a circle approximately two inches in diameter. These are then placed for a period of from ten to twelve hours in a constant temperature oven (37° C.). The purpose of this baking is to dry the extract so that it will not flow from the test piece. One drop of the compound to be tested is then placed in the middle of the malt treated disk and spread uniformly over the surface of the malt. These are introduced into the cage after a period of fifteen minutes. The disks are pinned to the inside screened surface of the cage. They are placed in the cage in such a manner that the untreated surface of the disk faces the light. Generally four or five disks are placed in each cage and in every case one of the disks contains only the malt extract. This serves as a check and all results are compared to it.

The principal of this procedure is to protect a known attractant. The malt was previously found to be quite attractive to the flies for whom it served as food. The natural tendency of the flies, therefore, is to be attracted to and eat the malt. The repellent properties of the test compound are measured by its ability to overcome this natural tendency. The order of repellency of compounds is easily tested by this method since the flies will eat all of the malt upon the most attractive disk, and after exhaustion of this malt will go to the test sample least repellent. In the case of highly repellent compounds, no flies will eat the treated malt or light upon the disk containing it.

Fifteen minutes after the introduction of the test sample the number of flies feeding upon each disk is recorded. Counts are made at half hour intervals thereafter for a period of at least three hours.

Using the above described conditions the results obtained are shown in the following tables:

TABLE 1
Repellent action of $C_2$, $C_3$, $C_4$ and $C_7$ nitriles (Number of flies feeding)

| Time in minutes | Nitrile | | | | | |
|---|---|---|---|---|---|---|
| | Blank (Dimalt) | Aceto $C_2$ | Propio $C_3$ | Butyro $C_4$ | Valero $C_5$ | Enantho $C_7$ |
| 15 | 55 | 28 | 39 | 12 | 42 | 48 |
| 45 | 49 | 26 | 24 | 30 | 33 | 44 |
| 75 | 20 | 31 | 13 | 19 | 12 | 17 |
| 105 | 17 | 26 | 12 | 14 | 8 | 9 |
| 135 | 7 | 20 | 5 | 10 | 4 | 7 |
| 165 | 4 | 4 | 4 | 5 | 5 | 6 |
| Total | 152 | 135 | 97 | 90 | 104 | 131 |

A study of Table 1 shows that none of the nitriles tested has any marked repellent activity.

TABLE 2
Repellent action of $C_8$, $C_{12}$, $C_{13}$, $C_{15}$ and $C_{17}$ nitriles

| Time in minutes | Nitrile | | | | | |
|---|---|---|---|---|---|---|
| | Blank (Dimalt) | Caprylo $C_8$ | Lauro $C_{12}$ | Tridecylo $C_{13}$ | Pentadecylo $C_{15}$ | Margaro $C_{17}$ |
| 15 | 28 | 1 | 0 | 1 | 21 | 23 |
| 45 | 15 | 7 | 0 | 0 | 18 | 20 |
| 75 | 18 | 10 | 0 | 0 | 9 | 29 |
| 105 | 9 | 10 | 0 | 0 | 5 | 14 |
| 135 | 12 | 12 | 0 | 0 | 6 | 10 |
| 165 | 5 | 10 | 0 | 0 | 3 | 8 |
| Total | 87 | 50 | 0 | 1 | 62 | 104 |

The results given in Table 2 show caprylonitrile and pentadecylo nitrile to be only very slightly repellent, margaro nitrile to possess essentially no repellency, and lauro and tridecylo nitriles to be very highly repellent.

TABLE 3
Repellent action of $C_6$, $C_9$, $C_{10}$, and $C_{11}$ (saturated and unsaturated nitriles)

| Time in minutes | Nitrile | | | | | |
|---|---|---|---|---|---|---|
| | Blank (Dimalt) | Capro $C_6$ | Pelargono $C_9$ | Capri $C_{10}$ | Undecylo $C_{11}$ (sat.) | Undecyleno $C_{11}$ (unsat.) |
| 15 | 39 | 26 | 0 | 0 | 0 | 0 |
| 45 | 42 | 29 | 0 | 0 | 0 | 0 |
| 75 | 14 | 26 | 5 | 3 | 0 | 0 |
| 105 | 20 | 15 | 6 | 0 | 1 | 0 |
| 135 | 17 | 12 | 10 | 0 | 0 | 0 |
| 165 | 9 | 8 | 6 | 5 | 0 | 0 |
| 195 | 3 | 4 | 4 | 4 | 0 | 0 |
| Total | 144 | 120 | 31 | 12 | 1 | 0 |

A study of the results reported in Table 3 shows that capro nitrile possesses little, if any, repellent action that pelargono nitrile is somewhat repellent, that capri nitrile is strongly repellent, and that undecylo and undecyleno nitriles are very highly repellent.

TABLE 4
Repellent action of $C_{12}$, $C_{14}$ and $C_{16}$ nitriles

| Time in minutes | Nitrile | | | |
|---|---|---|---|---|
| | Blank (Dimalt) | Lauro $C_{12}$ | Myristo $C_{14}$ | Palmito $C_{16}$ |
| 15 | 35 | 0 | 3 | 4 |
| 45 | 48 | 0 | 2 | 8 |
| 75 | 34 | 0 | 0 | 2 |
| 105 | 36 | 0 | 0 | 5 |
| 135 | 31 | 0 | 0 | 6 |
| 165 | 20 | 0 | 0 | 1 |
| 195 | 14 | 0 | 0 | 3 |
| Total | 218 | 0 | 5 | 29 |

A study of the results reported in Table 4 shows that palmito nitrile is somewhat repellent and that lauro and myristo nitriles are extremely highly repellent. This is the second series in which lauro nitrile has been included and in both cases it proved highly effective.

TABLE 5
Repellent action of $C_{12}$ and $C_{13}$ nitriles (perfumed and unperfumed)

| Time in minutes | Nitrile | | | | |
|---|---|---|---|---|---|
| | Blank (Dimalt) | Lauro perfumed | Lauro unperfumed | Tridecylo perfumed | Tridecylo unperfumed |
| 15 | 27 | 1 | 0 | 1 | 1 |
| 45 | 15 | 0 | 0 | 1 | 2 |
| 75 | 19 | 0 | 0 | 0 | 0 |
| 105 | 18 | 1 | 0 | 1 | 1 |
| 135 | 17 | 0 | 0 | 0 | 1 |
| 165 | 15 | 0 | 0 | 0 | 0 |
| Total | 111 | 2 | 0 | 3 | 5 |

The perfume used has the odor of wisteria. Other types of perfume show similar results.

TABLE 6
Repellent action of stearonitrile

| Time in minutes | Nitrile | |
|---|---|---|
| | Blank (Dimalt) | Stearo $C_{18}$ |
| 15 | 19 | 18 |
| 45 | 13 | 11 |
| 75 | 7 | 1 |
| 105 | 3 | 2 |
| 135 | 5 | 3 |
| 165 | 6 | 0 |
| 195 | 6 | 4 |
| Total | 59 | 39 |

From the results of Table 6 it can be seen that stearonitrile is only mildly repellent.

Since lauro nitrile is a derivative of lauric acid we have compared the effectiveness of lauric acid and lauro nitrile. Table 7 gives the results obtained.

TABLE 7
Repellent action of lauric acid compared to undecyclonitrile

| Time in minutes | Compound | | |
|---|---|---|---|
| | Blank (Dimalt) | Lauric acid | Undecyclonitrile |
| 15 | 20 | 13 | 0 |
| 45 | 18 | 3 | 0 |
| 75 | 21 | 5 | 0 |
| 105 | 19 | 10 | 0 |
| 135 | 16 | 3 | 0 |
| 165 | 12 | 1 | 0 |
| Total | 106 | 35 | 0 |

From the results presented in Table 7 it is evident that lauric acid is only mildly repellent when compared to undecylonitrile.

The following table compares the effectiveness of lauronitrile with a commercial product now marketed for this purpose. The product marked "A" is a product now marketed as an insect repellent. The results obtained when this substance was compared with lauronitrile are shown in Table 8.

TABLE 8

*Repellent action of commercial preparation "A" compared to lauronitrile*

| Time in minutes | Compound | | |
|---|---|---|---|
| | Blank (Dimalt) | "A" | Lauro-nitrile |
| 15 | 59 | 36 | 0 |
| 45 | 30 | 74 | 0 |
| 75 | 31 | 69 | 0 |
| 105 | 16 | 36 | 0 |
| 135 | 28 | 21 | 0 |
| 165 | 9 | 30 | 0 |
| 195 | 10 | 20 | 0 |
| Total | 183 | 286 | 0 |

It will be noted that the repellent action of the lauronitrile is outstanding in comparison to product A. A mild repellency was shown by product A which lasted for approximately one-half hour.

In Table 9 the repellent action of several nitriles is compared against the action of citronella. The oil of citronella was selected because of its long established reputation as an insect repellent. The test sample was prepared by adding one drop of oil of citronella to a sample disk containing dimalt. It is, of course, understood that in this test as in all previously described the dimalt is present. The following table shows the effectiveness of various nitriles compared to oil of citronella.

TABLE 9

*Repellent action of oil of citronella, undecylonitrile, lauronitrile, and tridecylonitrile*

| Time in minutes | Compound | | | | |
|---|---|---|---|---|---|
| | Blank (Dimalt) | Oil of citronella | Undecylonitrile | Lauronitrile | Tridecylonitrile |
| 15 | 36 | 6 | 0 | 0 | 0 |
| 45 | 39 | 4 | 0 | 0 | 0 |
| 75 | 57 | 11 | 0 | 0 | 0 |
| 105 | 41 | 9 | 0 | 0 | 0 |
| 135 | 49 | 7 | 0 | 0 | 0 |
| 165 | 47 | 19 | 0 | 0 | 0 |
| 195 | 31 | 11 | 0 | 0 | 0 |
| Total | 300 | 67 | 0 | 0 | 0 |

From the results presented in Table 9 it is evident that undecylonitrile, lauronitrile, and tridecylonitrile are superior in repellent action to oil of citronella.

We have investigated the repellent action of nitriles containing from ten to fourteen carbon atoms against mosquitoes. The method of performing these tests was as follows: the mosquitoes were enclosed in a screened cage equipped with rubber sleeves. The operator spreads several drops of the material to be tested over his forearm and inserts his arm into the cage through the sleeves. If the compound possesses high repellent action the mosquitoes do not attack the operator's arm. However, if the compound is mildly repellent, or possesses no repellent activity, they immediately attack the operator. These tests were performed using oil of citronella, and the various nitriles reported herein. The results showed conclusively that nitriles of from ten to fourteen carbon atoms possess a high degree of repellency for mosquitoes.

Ants are also repelled by the nitriles of the present invention. When, for example, inert powder, such as pumice, is admixed with a small amount of the nitrile and the resulting product used as a dusting powder, we find that ants avoid areas which have been dusted. Thus, for example, such dusting powders can be used in the vicinity of the places where ants gain access to the interior of buildings.

The foregoing experimental results have been given in great detail in order that those skilled in the art may be shown the effectiveness of our repellents. We have, moreover, compared the most effective one, namely undecylonitrile with lauric acid for the purpose of showing that repellent activity is not common to compounds having the same carbon chain length.

One rather interesting observation may be made. The lower chain nitriles, $C_6$ to $C_{10}$, possess quite objectional odors to humans. Caprinitrile possesses a very mild odor and pure lauronitrile is essentially without odor. The repellent activity for insects begins at that point when the objectional odor to humans disappears.

Feeding tests of nitriles using rabbits, rats, and guinea pigs show them to be without toxic action. Dodecyl nitrile was injected subcutaneously without serious effect. Dodecyl nitrile rubbed upon the skin of humans, dogs, and rats is without effect.

Our discoveries may be applied in many ways. Since the nitriles which we use are not harmful to the skin of humans small amounts thereof may be rubbed directly upon the skin of the user in the same way as citronello is applied. Or, the nitrile can be dissolved in any suitable solvent which is likewise innocous to human skin, and applied as a liquid. For the protection of exposed food stuffs, paper or other inexpensive sheet material can be coated or impregnated with the nitrile and laid on the articles of food to be protected. Thus, for example, small sheets of Kraft paper can be impregnated with the nitrile and kept about butcher shops. Meats which are normally exposed to flies on the counter can be covered with such impregnated paper and flies will avoid such protected products.

Insect dusting powders have already been described. Moth repellent compositions can be prepared by dissolving the nitrile in a suitable liquid vehicle and woolen fabrics sprayed therewith.

We do not wish to restrict our invention to any specific application of our discoveries. In broad aspects, our invention comprises an insect repellent containing saturated or unsaturated aliphatic nitriles containing from ten to fourteen carbon atoms. It will be apparent to those skilled in the art that there are many different compositions which can be prepared and which include such nitriles as an active repellent therein.

We can also, of course, combine our nitriles with other insect repellents, and even with contact insecticides or insect poisons so that we gain both a repellent and a killing power in the product.

Since the addition of perfumes to the nitriles does not change their repellent character we can prepare mixtures of our nitriles and any chosen perfume.

Having thus described our invention, what we claim is:

1. An insect repellent having as an essential active constituent a straight chain aliphatic nitrile having ten to fourteen carbon atoms.
2. An insect repellent having as an essential active constituent a straight chain aliphatic nitrile having ten to fourteen carbon atoms and a perfuming substance.
3. An insect repellent containing lauro nitrile as an active essential constituent.
4. An insect repellent containing undecylenonitrile as an active essential constituent.
5. An insect repellent containing tridecylonitrile as an active essential constituent.

ANDERSON W. RALSTON.
JOHN P. BARRETT.